United States Patent [19]

Argy et al.

[11] Patent Number: 5,242,830
[45] Date of Patent: Sep. 7, 1993

[54] PROCESS AND DEVICE FOR REVEALING IMPACT(S) RECEIVED BY A SUBSTRATE

[75] Inventors: Gilles Argy, La Queue; André Cheymol, S'Romain; Hubert Hervet, Chatenay-Malbry, all of France

[73] Assignee: Hutchinson, Paris, France

[21] Appl. No.: 708,176

[22] Filed: May 31, 1991

[30] Foreign Application Priority Data

Jun. 6, 1990 [FR] France ................. 90 06989
Nov. 22, 1990 [FR] France ................. 90 14570

[51] Int. Cl.⁵ .................. G01N 31/22; G01L 5/00
[52] U.S. Cl. ........................... 436/5; 73/12.01; 73/82; 73/844; 116/200; 116/203; 116/206
[58] Field of Search ............................ 436/3–5; 73/12, 82, 844; 116/203, 206, DIG. 41, 200

[56] References Cited

U.S. PATENT DOCUMENTS 3,657,928 4/1972 Melamed ................. 73/515
4,362,645 12/1982 Hof et al. ................. 436/2
4,424,911 1/1984 Resnick ................. 116/203

FOREIGN PATENT DOCUMENTS 310496 8/1929 United Kingdom .

OTHER PUBLICATIONS

Leung, K. P., et al., "Photoluminescence determination of the pressure and temperature of the shock wave induced by a picosecond laser pulse in the layered semiconductor GaSe", 8073B Physical Review B, vol. 31, No. 2, Jan. 15, 1985, Woodbury, N.Y., pp. 942–946.

Primary Examiner—Lyle A. Alexander
Attorney, Agent, or Firm—Bell, Seltzer, Park & Gibson

[57] ABSTRACT

A process and device for revealing impact(s) received by a substrate make use of a film capable of being deposited onto said substrate and consisting of a matrix in which are embedded microcapsules intended to be broken during the impact and thus to release product(s) which they enclose and which is (are) endowed with different photoluminenscence properties according to whether it is (they are) encapsulated or released into the matrix.

25 Claims, 1 Drawing Sheet

PROCESS AND DEVICE FOR REVEALING IMPACT(S) RECEIVED BY A SUBSTRATE

BACKGROUND OF THE INVENTION

The invention relates to a process and a device for revealing impact(s) received by a substrate.

In many industrial fields it is desirable to have available a means enabling impact(s) received by a substrate or a structure to be made perceptible, which would not be made so otherwise. This is the case, for example, with substrates or structures made of metal or of composite material(s) subjected to impacts producing no effect visible to the naked eye but, especially in the case of composite materials, capable of resulting in initiations of failure which are subsequently followed by a deterioration of the material and, consequently, of the structure with highly damaging consequences which it is important to be able to remedy as soon as they are produced. This is the case, inter alia, in the field of aviation, where the invention finds a particularly advantageous application without, however, any limiting nature being associated with this indication.

In some cases it is also desirable to have available a means enabling the intensity of the impact(s) received by the substrate or the structure to be made perceptible.

It is consequently a general objective of the invention to provide a process and a device which enable impact(s) received by a substrate to be revealed.

It is equally an objective of the invention to provide a process and a device which enable the intensity of the impact(s) received by a substrate to be revealed.

It is also an objective of the invention to provide such a process and such a device which are highly reliable and which do not, or only extremely slightly, modify the appearance, the weight and the properties of the substrate or of the structure to be supervised.

It is, again, an objective of the invention to provide such a process and a device for implementing it which, while being highly accurate and reliable, do not reflect the results of the impact(s) received by the substrate in a manner which is immediately perceptible to the eye, but require the use of a means of detection to visualise it, this being for reasons of confidentiality, safety or the like.

SUMMARY OF THE INVENTION

The problem prevented is solved, according to the invention, by employing, as means intended to disclose impact(s) received by a substrate, a film or thin skin capable of being added onto the said substrate and consisting of a matrix in which are embedded microcapsules intended to be broken during the impact and thus to release product(s) which they enclose and which is (are) endowed with different photoluminescence properties according to whether it is (they are) encapsulated or released into the matrix.

In a preferred embodiment of the invention, the photoluminescence is a fluorescence.

In this latter case, the invention makes provision in a first embodiment for applying the physical phenomenon known by the name of "solid-phase blocked intramolecular dynamic extinction", and accordingly uses products which are known by the name of "free rotators" that is to say products which have a fluorescence which is very weak or practically nil when they are in liquid solution, whereas the fluorescence yield becomes very high when the said products are "trapped" in a solid matrix where the rotational motion of the molecules of which they consist are greatly hindered.

In another embodiment, forming an alternative form of that described above, the substances used are molecules of the type capable of undergoing a charge transfer by intramolecular torsion.

In another embodiment, the invention applies the phenomenon of "dynamic" inhibition of the fluorescence of certain substances, that is to say of the phenomenon by means of which the fluorescence yield of the molecules of which these substances are constituted is inhibited by agents known as "fluorescence inhibitors" which act as such to the full as long as they are present in liquid solution with the fluorescent substances in the microcapsules which are embedded in the matrix, whereas this inhibiting action no longer exists, or to a markedly lesser degree, after rupture of the microcapsules when the said agents diffuse into the matrix, where they evaporate off with the solvent or else are "trapped".

In still another embodiment, the microcapsules enclose a substance which is normally fluorescent and which retains its properties whether it is mixed with a solvent in the microcapsules or released into the matrix in which it can diffuse after an impact destroying the microcapsules. In this embodiment the disclosure of impact(s) is then obtained by a comparison of an image of the substrate or of the structure coated with the film or thin skin according to the invention before an impact has been received—and where each microcapsule appears in the form of a luminescent point—and of an image of the said structure after a possible impact and, then, disappearance of the luminescent points, but appearance of diffuse lines or regions making said impact(s) visible.

Whatever the embodiment, the invention provides for embedding the impact-sensitive microcapsules in a matrix based on polymer(s) of the type of a single-component varnish drying by evaporation or a two-component varnish for polymerization and/or crosslinking, which is transparent to the exciting radiation and to the reemitted photoluminescence radiation.

The hardness and the fragility of the microcapsule coat are, of course, chosen as a function of the desiderata in practice, on the one hand, (resistance to impact(s) of given intensity and characteristics), but also, on the other hand, as a function of the physical or chemical characteristics of the substances capable of providing a photoluminescent radiation and of the matrix which encloses the said microcapsules.

Thus, in an embodiment making use of "free rotators", the product whose appropriate organic molecules constitute said "rotators" is dissolved in a solvent capable of dissolving said molecules, which is obviously inert towards the coating of the microcapsule and which has a high vapor pressure for a rapid evaporation in the matrix in which it must be able to migrate easily, advantageously by dissolving the constituent material(s) of the latter.

Among the products capable of being employed as "free rotators", good results have been obtained with di- and triphenylmethanes such as tetramethyldiaminodiphenyl ketone (Michler's ketone), tetramethyldiaminophenylketimine hydrochloride (known as Auramine O), Fuchsin Acid, Crystal Violet, Ethyl Violet, Malachite Green, Victoria blue, Patent Blue, Ethyl Green and Wool Green.

Good results have also been obtained from stilbene derivatives and especially cis-stilbene, trans-α-methyl-stilbene, trans-α,α'-dimethylstilbene, trans-2,4,6-trimethylstilbene, triphenylethylene and tetraphenylethylene.

Satisfactory results have also been obtained by employing malononitriles as "free rotators".

In order to dissolve these organic molecules the invention provides for the application of chlorinated solvents such as chloroform, carbon tetrachloride, trichloroethylene or dichloroethane, but also of solvents such as xylene or cyclohexane or other solents which are neither toxic nor flammable.

Given that, as shown above, after rupture of the microcapsules under the influence of an impact the solvent must be able to migrate into the matrix, the choice of the solvent depends, of course, on the nature of the matrix in which it must diffuse, and good results have also been obtained by using alcohols, acetones or acetates as these solvents.

The matrix itself is advantageously a medium of the paint or varnish type, based on single- or two-component polyurethane resins, epoxy resins, acrylic resins, styrene resins or glycerophthalic resins, enclosing the microcapsules whose shells or coats are preferably made of plastics of the polyamide type.

In embodiments making use of a "dynamic" inhibition, that is to say a process of deexcitation of fluorescent molecules by collisions with inhibiting molecules diffusing in a solvent, the microcapsules enclose a three-component system, namely a fluorescer, an inhibitor and the solvent properly so called.

Good results have been obtained, in these embodiments, with the following systems:

| Flourescer | Inhibitor | Solvent |
|---|---|---|
| Perylene | CBr$_4$ | Benzene |
| " | " | Decalin |
| Rubrene | " | Benzene |
| " | " | Cyclohexane |
| 1,2-Benzanthracene | " | Mineral Oil |
| Anthracene | K$^+$CNSe$^-$ | Methanol |
| Anthracene | K$^+$I$^-$ | " |
| or with the following systems: | | |
| Pyrene | N,N-Dimethylaniline | Acetonitrile |
| " | " | Dimethylformamide |
| " | " | Ethanol |
| Pyrene | Tetracyanobenzene | Acetonitrile |
| " | " | n-Hexane |
| " | o-Dicyanobenzene | Acetonitrile |
| " | p-Dicyanobenzene | " |
| " | m-Dicyanobenzene | Methanol |
| " | α-Cyanonaphthalene | " |
| " | m-Dicyanobenzene | Micelle |
| Methylpyrene | " | Micelle |
| Perylene | N,N-Dimethylamine | Acetone |
| Diethylindolindole | p-Cyanotoluene | Micelle |
| " | α-Cyanonaphthalene | Micelle |
| Ru(bpy)$_3^{2+}$ | 1-Naphthylamine | Acetonitrile |
| Ru(bpy)$_3^{2+}$ | " | Propionitrile |
| " | " | Acetone |
| " | " | Methanol |
| " | " | Ethanol |
| " | " | 2-Propanol |
| " | N,N,N',N'-Tetramethyl-p-phenylenediamine | Acetonitrile |
| " | " | " |
| Ru(bpy)$_3^{2+}$ | 4-Aminodiphenyl-amine | Acetonitrile |
| " | Phenothiazine | " |
| " | N,N-Dimethylaniline | " |
| " | Duroquinone | " |
| " | N,N,N',N'-Tetramethyl 1,4-benzenediamine | " |
| " | N,N,4-Trimethylbenzene-diamine | " |
| " | N,N-Dimethylaniline Methanol N,N-Dimethyl-p-toluidine | " |
| " | N,N,N',N'-Tetramethyl-p-phenylenediamine | " |

In one of its embodiments, the process according to the invention consists, therefore, in applying onto the surface of the substrate or structure liable to be subjected to impacts, and in the form of a film of thin skin, the matrix of the varnish or paint type in which are embedded the microcapsules enclosing the product(s) with a photoluminescence property, and in then causing the matrix to dry or crosslink, these operations being subsequently followed, in order to reveal possible impact(s), by a photoluminescent excitation of the film or thin skin causing a photoluminescent reemission corresponding to of the broken microcapsules.

When it is additionally desired to reveal the intensity of the impact(s) received by the substrate, the process according to the invention consists in employing microcapsules with shells of different fragilities which enclose products which, when released into the matrix, have different optical characteristics.

In a preferred embodiment of such a process, according to which the photoluminescence is a fluorescence, the invention provides for applying, as products which are enclosed in the microcapsules, organic molecules whose optical characteristics differ from each other in the absorption or emission or absorption and emission spectra.

In one embodiment, the organic molecules used are stilbene derivatives and, more precisely, trans-α,α'-dichlorostilbene and trans-α,α'-dimethylstilbene, corresponding to the formulae:

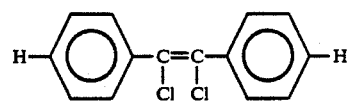

[1]

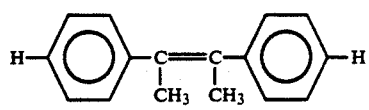

[2]

which differ from each other in their emission and absorption spectra.

To reveal different intensities of the impact(s) received by a substrate, the latter is therefore illuminated with a light of wavelength $\lambda_1$ and the radiation emitted at a wavelength $\lambda_2$ is observed, and this discloses the presence of the compound [1], whereas illumination of the substrate with a radiation of wavelength $\lambda_3$ and observation at a wavelength $\lambda_4$ makes it possible to detect the presence of the compound [2].

In an alternative form of embodiment the organic molecules used belong to the cis-stilbene class.

In another embodiment the organic molecules used are cis-4,4'-dimethylstilbene, on the one hand, and a molecule from the malononitrile class, such as p-dimethylaminobenzylidenemalononitrile, on the other hand.

These compounds, of respective formulae:

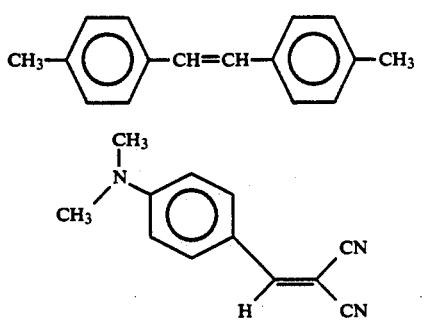

[3]

[4]

make it possible to reveal impact(s) of different intensities received by the substrate, when the latter is illuminated with a wavelength $\lambda_5$ and observed at a wavelength $\lambda_6$, to select the fluorescence emitted by the compound [3], whereas illumination of the substrate at a wavelength $\lambda_7$ and its observation at a wavelength $\lambda_8$ makes it possible to select the fluorescence emitted by the compound [4].

In an alternative form of embodiment the invention envisages using triphenylethylene instead of cis-4-4'.

In an alternative form of embodiment the invention envisages using triphenylethylene instead of cis-4,4'-dimethylstilbene.

Whatever the embodiment, the microcapsules whose shells are sensitive to impacts of different intensities are embedded in a matrix based on polymer(s) of the type of a one-component varnish drying by evaporation or of a two-component varnish for polymerization and/or crosslinking, which is transparent to the exciting radiation and to the reemitted photoluminescence radiation.

In one of its embodiments, the process according to the invention consists, therefore, in applying onto the surface of the substrate or structure liable to be subjected to impacts, in the form of a film or thin skin, the matrix of the varnish or paint type in which are embedded the microcapsules enclosing the product(s) with different photoluminescence properties, and in then causing the matrix to dry or crosslink, these operations being subsequently followed, in order to reveal possible impact(s), by illuminating the film or thin skin with a radiation of a given wavelength to produce a photoluminescent reemission corresponding to those of the broken microcapsules, which photoluminescent reemission itself is observed at a given wavelength which is generally different from that of excitation.

BRIEF DESCRIPTION OF THE DRAWINGS

Other characteristics and advantages of the invention will appear from the following description of examples of embodiments, which is given with reference to the attached drawing in which.

DETAILED DESCRIPTION

I. "Free Rotators" Device

Figure 1:
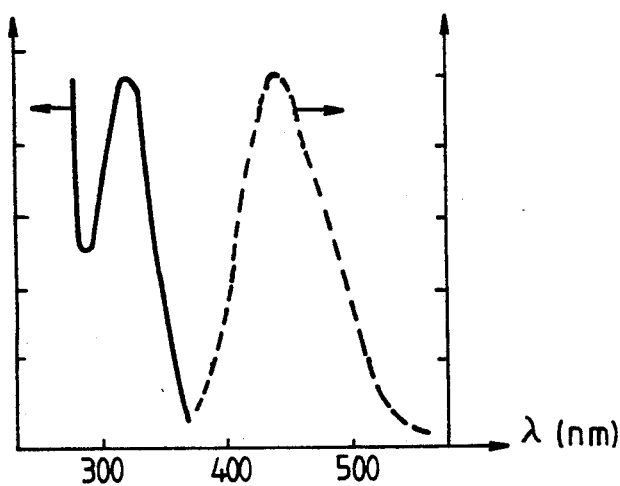
FIGS. 1 to 3 are explanatory diagrams

To produce a device according to the invention, intended to enable impact(s) received by a substrate or structure to be revealed, a medium of the paint or varnish type is first of all manufactured, which is capable of being applied in the form of a film or thin skin onto the said substrate or structure and which consists of a matrix in which are embedded microcapsules enclosing the said molecules of "free rotators" and their solvent.

I.1. Preparation of the Microcapsules

These consist of a shell or coat of spherical overall shape, with an average size of 20 to 40 $\mu$m, enclosing, as the substance whose organic molecules behave as "free rotators", triphenylethylene in a solvent consisting of xylene.

To produce the microcapsules 8 mg of triphenylethylene are dissolved in 80g of xylene. This solution is added to a solution at pH 3.5, consisting of:

0.5 g of resorcinol, 5 g of urea, 250 g of water containing 1.25% of PVA (8188).

When the droplets of the emulsion thus prepared have the desired size of 20 to 40 $\mu$m, the temperature is adjusted to 40° C. and 40 ml of a 37% solution of formaldehyde are added. Stirring is continued for 15 hours and the microcapsules are then washed and filtered off. They are then dried in a stream of air at a low temperature, from 20 to 30° C.

I.2. Preparation of the matrix

This is chosen to be able to form a film or thin skin on the substrate or structure to be investigated, so as not to modify or only extremely slightly to modify the appearance, weight and properties of the said substrate or structure.

Being chosen to permit the passage of the exciting radiation and the radiation reemitted by the "free rotators" when the latter are no longer enclosed in their microcapsules, it consists, in the example described, of an epoxy resin whose crosslinking is obtained with the aid of peroxide.

To prepare the varnish intended to form the film or thin skin, the microcapsules are then introduced with slow stirring (approximately one hour and at a low temperature of 20 to 25° C.) into the resin part of the two-component mixture for crosslinking with peroxide, in this case a Celomer resin type 7 020.

To apply the varnish, the resin is added, after mixing with the crosslinking component, onto the structure or substrates to be investigated, for example a model of an aircraft wing or of a helicopter blade.

When such a structure is illuminated by an exciting radiation no fluorescence can be detected because of the extremely low value of the fluorescence yield of the "free rotators" enclosed in a liquid phase in the microcapsules where—without the Applicant Company being committed by this explanation—the possibilities offered to the molecules of rotating rapidly relative to one another for a period which is much shorter than the intrinsic lifetime of the excited state cause a deexcitation without emission of radiation by said molecules. When, on the other hand, the same structure is excited after an impact has taken place, breaking the shell of some microcapsules with consequent diffusion of the liquid phase into the matrix and evaporation of the solvent, the molecules of "free rotators" of very low volatility recover their normal fluorescence yield, generating a radiation of characteristic wavelength which, over a period which may be of the order of a few hours to a few days or longer, reflects the impact(s) which has (have) caused the rupture of the said microcapsules.

II. Dynamic Inhibition Device

II.1 Preparation of the Microcapsules 2.4 mg of naphthacene (fluorescer) and 16 g of carbon tetrabromide ($CBr_4$, acting as inhibitor) are dissolved in 40 g of cyclohexane. The solution is emulsified in an aqueous solution whose composition is:
26 g of urea/formaldehyde resin,
0.06 g of 12.5 % HCl,
160 g of water.
0.02 g of a 2.5 % solution of HCl are added after 5 minutes, 30 minutes and 60 minutes of emulsification, the operation being carried out at room temperature.

After 15 hours stirring at 40° C. the solution is neutralized with sodium hydroxide.

The microcapsules are then washed and filtered off and are then dried in a stream of lukewarm air at 40° C.

II.2 Preparation of the Matrix

The microcapsules prepared as indicated above are then introduced into a one-component polyurethane varnish such as that known under the name Celomer (a registered trademark of the Celomer Company) in a proportion of 1 % by weight.

To apply the varnish, the latter is added by the usual methods in the form of a film onto a structure or substrate to be investigated, after the latter has been coated with a "Celomer" type PA66 primer (a registered trademark of the Celomer Company).

When the structure is illuminated with an exciting radiation no fluorescence is detected because of the presence, in each microcapsule, of a fluorescence inhibitor in combination with the naphthacene. On the other hand, when the same structure is excited after an impact has taken place, which has broken the shell of some microcapsules releasing the carbon tetrabromide which evaporates off, the uninhibited naphthacene recovers its normal fluorescence yield giving rise to a radiation of characteristic wavelength which expresses the impact(s) which has (have) caused the rupture of the microcapsules.

III. Device Enabling the Intensity of Impact(s) to be Made Perceptible

To make perceptible the intensity of impact(s) received by a substrate or structure—where it would not be so otherwise—a medium of the paint or varnish type is first of all manufactured, which is capable of being applied in the form of a film or a thin skin onto the said substrate or structure and which consists of a matrix in which are embedded microcapsules with shells of different fragilities enclosing molecules which have different optical characteristics, on the one hand, and endowed with different photoluminescence properties depending on whether they are encapsulated or released into the matrix, on the other hand.

When the photoluminescence phenomenon which is utilized is a fluorescence, the invention proposes to make use of molecules with different emission and/or absorption spectra. However, given that these spectra are relatively broad—as shown in FIG. 1, where the solid curve represents an absorption spectrum and the dashed curve a fluorescence emission spectrum—the process is implemented by employing either molecules which emit in the same band of the spectrum but with different absorption maxima (in which case it is the excitation which is filtered), or molecules which have identical absorption spectra but staggered emission spectra (in which case the emission is filtered), or else by making use of molecules which have different emission and absorption spectra, in which case both the emission and/or the absorption are filtered.

Figure 2:
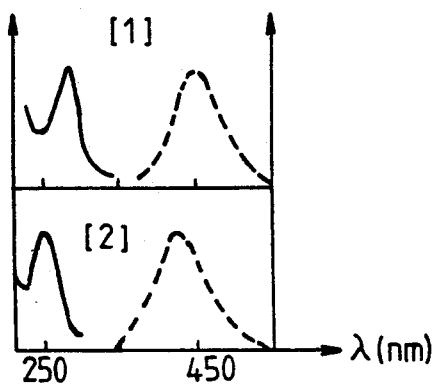

In a first embodiment the organic molecules used are stilbene derivatives and, more precisely, trans-$\alpha,\alpha'$-dichlorostilbene and trans-$\alpha,\alpha'$-dimethylstilbene, whose absorption and emission spectra, respectively, are plotted diagrammatically in FIG. 2, which shows the spectra of trans-$\alpha,\alpha'$-dichlorostilbene in its upper part and those of trans-$\alpha,\alpha'$-dimethylstilbene in its lower part.

In an alternative form of embodiment the molecules used are cis-stilbene derivatives.

Figure 3:
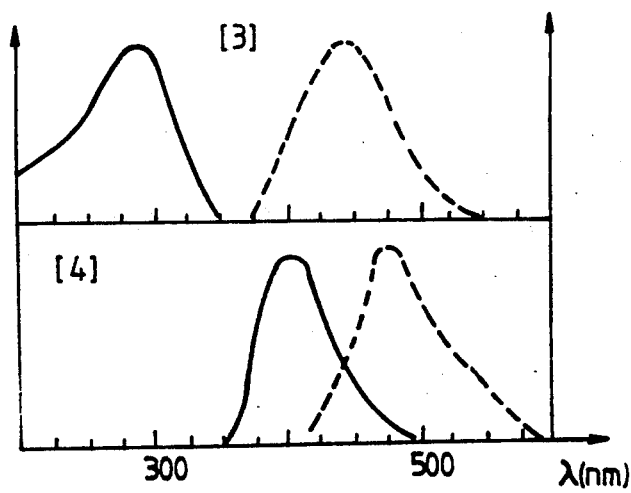

In another form of embodiment the organic molecules used are, on the one hand, cis-4,4'-dimethylstilbene and p-dimethylaminobenzylidenemalononitrile, whose absorption and emission spectra are illustrated in FIG. 3, where the curves in the upper part relate to cis-4,4'-dimethylstilbene and those in the lower part to p-dimethylaminobenzylidenemalononitrile.

Alternatively, cis-4,4'-dimethylstilbene is replaced with triphenylethylene.

To produce a device according to the invention, microcapsules of different fragilities are prepared first of all, followed by a matrix in which the said microcapsules are embedded, the whole then being added onto the substrate, as explained hereinafter.

A. Preparation of the Microcapsules

These consist of two classes of shells or coats of spherical overall shape with an average size of 20 to 40 $\mu$m enclosing the organic molecules specified above.

The shells or coats, which differ from each other in fragility, are produced from a solution of resorcinol, urea and water containing 1.25 % of PVA, to which a solution of formaldehyde is added subsequently.

By adjusting the stirring time of the emulsion droplets formed by the solution with the organic molecules employed, on the one hand, and by adjusting the reaction temperature, on the other hand, the thickness of the shells or coats manufactured is controlled, and hence their different fragilities to impacts.

B. Preparation of the Matrix

Being chosen so as to be capable of forming a film or thin skin on the substrate or structure to be investigated, so as not to modify or only extremely slightly to modify the appearance, the weight and the properties of the said substrate or structure, but also to allow the passage of the exciting radiation and the radiation reemitted by the organic molecules when the latter are no longer enclosed in their microcapsules, this consists, in the example described, of an epoxy resin whose crosslinking is obtained with the aid of peroxide.

C. Preparation of the Varnish

The varnish which is intended to form the film or thin skin is obtained by introducing the microcapsules with slow stirring (approximately 1 hour and at low temperature of the order of 20 to 25° C.) into the resin part of the two-component mixture for the crosslinking with epoxide, for example in this case a Celomer type 7020 resin.

To apply the varnish, the resin is added, after mixing with the crosslinking component, onto the structure or substrate to be investigated, for example a model of an aircraft wing or of a helicopter blade.

When such a structure is illuminated by an exciting radiation of predetermined wavelength, on the one hand, and is observed at another predetermined wavelength on the other hand, it is one or other of the compounds initially enclosed in the microcapsules and then released into the matrix in the event of impact(s) which is revealed, thus reflecting, as a function of the fragility of each of the shells enclosing the corresponding compound, the intensity of the impact(s) received by the substrate.

Thus, when the pair of molecules used is made up of the compounds [1] and [2], that is to say trans-$\alpha,\alpha'$-dichlorostilbene and trans-$\alpha,\alpha'$-dimethylstilbene, illumination of the substrate with a light of 300 nm wavelength and observation of this substrate at 500 nm discloses the compound [1], whereas it is an illumination with a light of 250 nm wavelength and an observation at 400 nm which discloses the compound [2].

On the other hand, when the molecules employed are those of compounds [3] and [4], that is to say cis-4,4'-dimethylstilbene and p-dimethylaminobenzylidenemalononitrile, the disclosure of the impacts received by the substrate is obtained by illuminating the said substrate with a radiation of 285 nm wavelength and by observing at 425 nm to select the fluorescence emitted by the compound [3], whereas an illumination at 400 nm and an observation at 525 nm discloses the fluorescence emitted by the compound [4].

Of course, the invention is not limited to the examples described above.

Thus, to increase the degree of stagger of the spectra of the products employed and to make the observation correspondingly easier, it is possible to make use of molecules which have a high phosphorescence yield, resulting in a shift of the emission spectrum towards long wavelengths, such as, for example, halogenated derivatives whose presence increases the phosphorescence yield at the expense of fluorescence.

What is claimed is:

1. A process for revealing impacts received by a substrate comprising applying to the substrate an impact sensitive layer comprising a matrix having dispersed therein frangible microcapsules intended to be broken by impact, said microcapsules comprising a shell having encapsulated therein one or more products having initial photoluminenscence properties while encapsulated in the microcapsules and having different photoluminescence properties when released from the microcapsules into the matrix, said products including a fluorescer and a fluorescence inhibitor which inhibits the fluorescence of the fluorescer so long as the inhibitor is present in liquid solution with the fluorescer to give the initial photoluminescence properties, the inhibiting effect of the fluorescence inhibitor being reduced after rupture of the microcapsules and release f the fluorescence inhibitor to give the different photoluminescence properties, and wherein the areas of impact where the microcapsules are broken exhibit the different photoluminescence properties.

2. The process as claimed in claim 1, wherein the product is selected from the group consisting of di- and triphenylmethanes, stilbene derivatives and malononitriles.

3. The process as claimed in claim 1, wherein the product is selected from the group consisting of tetramethyldiaminodiphenyl ketone, tetramethyldiaminophenylketimine hydrochloride Fuchsin Acid, Crystal Violet, Ethyl Violet, Malachite Green, Victoria Blue, Patent Blue, Ethyl Green, Wool Green, Cis-stilbene, trans-$\alpha$-methylstilbene, trans-$\alpha,\alpha'$-dimethylstilbene, trans-2,4,6-trimethylstilbene, triphenylethylene and tetraphenylethylene.

4. The process as claimed in claim 1, wherein the matrix is a medium based on a single-component or two-component polyurethane resin, one-component or two-component epoxy resin, acrylic resins, styrene resins or glycerophthalic resin.

5. The process as claimed in claim 1, wherein the shell of the microcapsule is a polyamide.

6. The process as claimed in claim 1 wherein the products used are molecules of the type capable of undergoing a charge transfer by intramolecular torsion.

7. The process as claimed in claim 1 wherein the shells of the microcapsules are of different fragilities.

8. The process as claimed in claim 1 wherein the microcapsules enclose a system consisting essentially of a fluorescer, an inhibitor and a solvent, and wherein the combination of fluorescer, inhibitor and solvent is selected from the group consisting of perylene/$CBr_4$/benzene; perylene/$CBr_4$/decalin; rubrene/$CBr_4$/benzene; rubrene/$CBr_4$/cyclohexane; 1,2-benzanthracene/$CBr_4$/mineral oil; anthracene/$K^+CNSe^-$/methanol; anthracene/$K^+I^-$/methanol; pyrene/N,N-dimethyaniline/acetonitrile; pyrene/N,N-dimethylaniline/dimethylformamide; pyrene/N,N-dimethylaniline/ethanol; pyrene/tetracyanobenzene/acetonitrile; pyrene/tetracyanobenzene/n-hexane; pyrene/o-dicyanobenzene/acetonitrile; pyrene/p-dicyanobenzene/acetonitrile; pyrene/m-dicyanobenzene/methanol; pyrene/$\alpha$-cyanonaphthalene/methanol; pyrene/m-dicyanobenzene/micelle; methylpyrene/m-dicyanobenzene/micelle; perylene/N,N-dimethylamine/acetone; diethylindolindole/p-cyanotoluene/micelle; diethylindolidole/$\alpha$-cyanonaphthalene/micelle; Ru(bpy)$_3^{2+}$/1-naphthylamine/acetonitrile; Ru(bpy)$_3^{2+}$/1-naphthylamine/propionitrile; Ru(bpy)$_3^{2+}$/1-naphthylamine/acetone; Ru(bpy)$_3^{2+}$/1-napthylamine/methanol; Ru(bpy)$_3^{2+}$/1-naphthylamine/ethanol; Ru(bpy)$_3^{2+}$/1-naphthylamine/2-propanol; Ru(bpy)$_3^{2+}$/N,N,N',N'-tetramethyl-p-phenylenediamine/acetonitirile; Ru(bpy)$_3^{2+}$/4-aminodiphenyl-amine/acetonitrile; Ru(bpy)$_3^{2+}$/phenothiazine/acetonitrile; Ru(bpy)$_3^{2+}$N,N-dimethylaniline/acetonitrile; Ru(bpy)$_3^{2+}$/duroquinone/acetonitrile; Ru(bpy)$_3^{2+}$/N,N,N',N'-tetramethyl-1,4-benzenediamine/acetonitrile; Ru(bpy)$_3^{2+}$/N,N,4-trimmethylbenzene-diamine/acetonitrile; Ru(bpy)$_3^{2+}$/N,N-dimethylaniline/methanol; Ru(bpy)$_3^{2+}$/N,N-dimethyl-p-toluidine/methanol; Ru(bpy)$_3^{2+}$/N,N,N',N'-tetramethyl-p-phenylenediamine/methanol.

9. The process as claimed in claim 1, wherein the encapsulated product(s) comprise organic molecules of the "free rotator" type in a solvent.

10. The process as claimed in claim 9, wherein the solvent is selected from the group consisting of chloroform, carbon tetrachloride, trichloroethylene, dichloroethane, xylene, cyclohexane, alcohols, acetones and acetates.

11. The process as claimed in claim 1 wherein said step of applying to the substrate an impact sensitive layer comprises applying a thin film of a matrix composition in which the microcapsules are dispersed and thereafter causing the matrix composition to dry or crosslink.

12. The process as claimed in claim 11 including the additional step, performed after the substrate has received an impact, of photoluminescently exciting the impact sensitive layer to cause a photoluminescent remission corresponding to the broken microcapsules.

13. The process as claimed in claim 12 including the further step of filtering the photoluminescent remission at one or more predetermined wave lengths.

14. The process as claimed in claim 1, in which the photoluminescence is a fluorescence, wherein the products which the microcapsules enclose are organic molecules whose optical characteristics differ from each other in their absorption or emission spectra.

15. The process as claimed in claim 14, wherein the microencapsulated products are trans-$\alpha,\alpha'$-dichlorostilbene and trans-$\alpha,\alpha'$-dimethylstilbene.

16. The process as claimed in claim 14, wherein the microcapsules enclose a pair of organic molecules consisting of trans-$\alpha,\alpha'$-dichlorostilbene and trans-$\alpha,\alpha'$-dimethylstilbene, and the substrate is illuminated with a light of 300 nm wavelength and observed at 500 nm to disclose trans-$\alpha,\alpha'$-dichlorostilbene or illuminated with a light of 250 nm wavelength and observed at 400 nm to disclose trans-$\alpha,\alpha'$-dimethylstilbene.

17. The process as claim in claim 14 wherein the microcapsules enclose a pair of organic molecules consisting of cis-4,4'-dimethylstilbene and p-dimethylaminobenzylidene-malononitrile, and the substrate is illuminated with a radiation of 285 nm wavelength and observed at 425 nm to disclose the fluorescence emitted by cis-4,4'-dimethylstilbene, or illuminated with a radiation of 400 nm and observed at 525 nm to disclose the fluorescence of p-dimethylamnobenzylidenemalononitrile.

18. The process as claimed in claim 14, wherein the products are organic molecules chosen from a compound from the stilbene class and a compound from the malononitrile class.

19. The process as claimed in claim 18, wherein the organic molecules chosen are cis-4,4'-dimethylstilbene and p-dimethylamnobenzylidenemalononitrile.

20. A device for revealing impacts received by a substrate comprising an impact sensitive layer applied to the substrate, said impact sensitive layer comprising a matrix having dispersed therein frangible microcapsules intended to be broken by impact, said microcapsules comprising a shell having encapsulated thereon one or more products having initial photoluminescence properties while encapsulated in the microcapsules and having different photoluminescence properties when released from the microcapsules into the matrix, said products including a fluorescer and a fluorescence inhibitor which inhibits the fluorescence of the fluorescer so long as the inhibitor is present in liquid solution with the fluorescer to give the initial photoluminescence properties, the inhibiting effect of the fluorescence inhibitor being reduced after rupture of the microcapsules and release of the fluorescence inhibitor to give the different photoluminescence properties, and wherein the areas of impact where the microcapsules are broken exhibit the different photoluminescence properties.

21. The device as claimed in claim 20 wherein the fluorescer is naphthacene, the inhibitor is carbon tetrabromide, and the solvent is cyclohexane and wherein the matrix in which the microcapsules are embedded is a one-component polyurethane varnish.

22. The device as claimed in claim 20 wherein the microcapsules have shells which are different fragilities and enclose products with differing optical properties.

23. The device as claimed in claim 20 wherein the matrix is a paint or varnish.

24. The device as claimed in claim 20 wherein the encapsulated products comprise organic molecules of the free rotator type.

25. The device as claimed in claim 24 wherein the organic molecules of the free rotator type comprise triphenylethylene and the microcapsules are between 20 and 40 micrometers $\mu$m in size and said matrix comprises a two component epoxy resin.

* * * * *

UNITED STATES PATENT AND TRADEMARK OFFICE
CERTIFICATE OF CORRECTION

PATENT NO. : 5,242,830
DATED : September 7, 1993
INVENTOR(S) : Gilles Argy et al.

It is certified that error appears in the above-identified patent and that said Letters Patent is hereby corrected as shown below:

On the Title Page, Item [75]:
The address for inventor André Cheymol should be -- St. Romain -- and the address for inventor Hubert Hervet should be -- Chatenay-Malabry --.

Column 1, line 48, "prevented" should be -- presented --.

Column 5, line 59, a period -- . -- should be inserted after "diagrams".

Column 9, line 46, "photoluminenscence" should be -- photoluminescence --.

Column 9, line 55, "f" should be -- of --.

Column 10, line 24, after "CNSe" should be -- CNSe⁻ --.

Column 10, line 44, "acetonitirile" should be -- acetonitrile --.

Column 10, line 50, "trimmethylbenzene" should be -- trimethylbenzene --.

UNITED STATES PATENT AND TRADEMARK OFFICE
CERTIFICATE OF CORRECTION

PATENT NO. : 5,242,830

DATED : September 7, 1993

INVENTOR(S) : Gilles Argy et al.

It is certified that error appears in the above-identified patent and that said Letters Patent is hereby corrected as shown below:

Column 11, line 28, "claim" (first occurrence) should be -- claimed --.

Column 11, lines 36-37, "p-dimethylamnobenzylidenemalononitrile" should be -- p-dimethylaminobenzylidenemalononitrile --.

Column 12, line 9, "thereon" should be -- therein --.

Signed and Sealed this

Fifteenth Day of March, 1994

Attest:

BRUCE LEHMAN

Attesting Officer    Commissioner of Patents and Trademarks